United States Patent
Bouchez et al.

(10) Patent No.: US 10,124,753 B2
(45) Date of Patent: Nov. 13, 2018

(54) CHARGE TRANSFER DEVICE AND ASSOCIATED MANAGEMENT METHOD

(75) Inventors: Boris Bouchez, Cergy (FR); Luis De Sousa, Eragny sur Oise (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 987 days.

(21) Appl. No.: 14/009,419

(22) PCT Filed: Apr. 5, 2012

(86) PCT No.: PCT/FR2012/050750
§ 371 (c)(1),
(2), (4) Date: Oct. 30, 2013

(87) PCT Pub. No.: WO2012/143642
PCT Pub. Date: Oct. 26, 2012

(65) Prior Publication Data
US 2014/0042807 A1 Feb. 13, 2014

(30) Foreign Application Priority Data

Apr. 8, 2011 (FR) ...................................... 11 53093

(51) Int. Cl.
*B60R 16/03* (2006.01)
*H02J 7/00* (2006.01)
(Continued)

(52) U.S. Cl.
CPC .............. *B60R 16/03* (2013.01); *B60L 1/006* (2013.01); *B60L 11/1803* (2013.01);
(Continued)

(58) Field of Classification Search
CPC ......... B60R 16/03; H02J 7/022; B60L 11/182
See application file for complete search history.

(56) References Cited

U.S. PATENT DOCUMENTS 4,258,969 A * 3/1981 Stallard .................. H01R 24/30
                                                                 318/739
7,119,513 B2 * 10/2006 Ishikawa .................. B60K 6/46
                                                                 318/151
(Continued)

FOREIGN PATENT DOCUMENTS

CN        101803147 A     8/2010
EP        2 197 086 A1    6/2010
(Continued)

OTHER PUBLICATIONS

Office Action Issued in Corresponding Chinese Application No. 201280027825.1, dated May 6, 2015 (39 Pages with English Translation).

(Continued)

*Primary Examiner* — Rexford Barnie
*Assistant Examiner* — Terrence Willoughby
(74) *Attorney, Agent, or Firm* — Osha Liang LLP (57) ABSTRACT

The present invention relates to a method of managing a charge transfer between, on the one hand means of accumulation (9) of an electrical control device (1) of an electric motor of a motor vehicle (43) and, on the other hand, an external electrical circuit (41) outside said motor vehicle (43), said electrical control device (1) comprising: a voltage converter (21) connected to the accumulation means (9); an H-bridge voltage inverter (3) connected to the voltage converter (21) on the one hand and to the phases of the electric motor on the other hand, characterized in that the method comprises a step of controlling the voltage converter (21) and the voltage inverter (3) as a function of the charge transfer.

20 Claims, 6 Drawing Sheets

(51) Int. Cl.
*B60L 11/18* (2006.01)
*H02J 7/02* (2016.01)
*B60L 1/00* (2006.01)

(52) U.S. Cl.
CPC ......... *B60L 11/185* (2013.01); *B60L 11/1812* (2013.01); *B60L 11/1814* (2013.01); *B60L 11/1816* (2013.01); *B60L 11/1846* (2013.01); *H02J 7/022* (2013.01); *B60L 2210/10* (2013.01); *B60L 2210/30* (2013.01); *B60L 2210/40* (2013.01); *B60L 2220/54* (2013.01); *B60L 2220/56* (2013.01); *Y02T 10/641* (2013.01); *Y02T 10/7005* (2013.01); *Y02T 10/7072* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/169* (2013.01); *Y04S 30/14* (2013.01)

(56) References Cited

U.S. PATENT DOCUMENTS 8,610,383 B2 * 12/2013 De Sousa ........... B60L 11/1803
　　　　　　　　　　　　　　　　　　　　　　　　318/139
2007/0219666 A1 * 9/2007 Filippov ............... H04L 67/12
　　　　　　　　　　　　　　　　　　　　　　　　700/245
2008/0316774 A1 * 12/2008 Ito ........................ B60K 6/48
　　　　　　　　　　　　　　　　　　　　　　　　363/17
2010/0318250 A1    12/2010 Mitsutani
2012/0176084 A1 * 7/2012 Klaes ............... B60L 11/1803
　　　　　　　　　　　　　　　　　　　　　　　　320/107

FOREIGN PATENT DOCUMENTS

| WO | 2007/066198 A2 | 6/2007 |
| WO | 2010/057892 A1 | 5/2010 |
| WO | 2010/057893 A1 | 5/2010 |
| WO | WO 201057892 * | 5/2010 |

OTHER PUBLICATIONS

"Living and Mobility—A Novel Multipurpose in-house Grid Interface with Plug in Hybrid BlueAngle", Udaya K. Madawala et al., Sustainable Energy Technologies, 2008. ICSET 2008. IEEE International Conference on, pp. 531-536, Nov. 24, 2008 (6 Pages).
International Search Report for corresponding International Application No. PCT/FR2012/050750, dated Jun. 19, 2012 (6 pages).

* cited by examiner

CHARGE TRANSFER DEVICE AND ASSOCIATED MANAGEMENT METHOD

The present invention relates to the field of electrical control devices for the electric motors of automotive vehicles and more particularly charge transfers at the level of the accumulation means of these devices.

In the prior art, electric motors are supplied by accumulation means, generally high-voltage rechargeable batteries which provide the energy necessary for the electric motor.

Moreover, in order to recharge these batteries, various means are envisaged such as for example the connection to single-phase or three-phase AC voltage domestic networks or DC voltage networks. Moreover, a charge transfer between two vehicles in order to recharge the batteries of one of the vehicles (for example in case of a fault caused by a low battery) also appears as a desirable possibility for improving the operation of electric vehicles and as a very beneficial function for users.

Nonetheless, with the devices of the prior art, the production of a charging and discharging device covering all of the aforementioned possibilities, requires the addition of numerous electrical components in order to allow charge transfer between the various configurations of electric circuits outside the vehicle and the rechargeable batteries of the vehicle.

Patent applications EP 2 197 086 and WO 2007/066198 disclose charge transfer devices comprising two inverters each interposed between one and the same DC bus and a star-coupled electric motor. Neither of these documents discloses an H-bridge inverter linked on the one hand to the voltage converter and on the other hand to the phases of the electric motor. The aim of the present invention is therefore to propose a method and a device making it possible to perform charge transfers between a large number of configurations of electric circuits and the batteries of the vehicle while adding a restricted number of electrical components.

The subject of the embodiments of the present invention is therefore a method for managing a charge transfer between, on the one hand accumulation means of an electrical control device for an electric motor of an automotive vehicle and, on the other hand, an exterior electric circuit outside said automotive vehicle, said electrical control device comprising:
  a voltage converter connected to the accumulation means,
  an H-bridge voltage inverter connected to the voltage converter on the one hand and to the phases of the electric motor on the other hand.

The method also comprising a step of control of the voltage converter and of the voltage inverter as a function of the charge transfer.

According to one embodiment, the method furthermore comprises, before the control of the converter and of the voltage inverter:
  the connection of the electrical control device to the exterior electric circuit outside the vehicle,
  the determination of the charge transfer, especially on the basis of a detection of the configuration of the exterior electric circuit to which the electrical control device is connected.

According to one embodiment, the phases of the electric motor comprise a midpoint winding, and the connection of the device to the exterior electric circuit outside the vehicle comprises the connection of midpoints of the phases to predetermined terminals of the exterior electric circuit.

According to an additional embodiment, the detection of the configuration of the exterior electric circuit comprises the establishment of a command line allowing the vehicle to exchange with the exterior electric circuit information relating to the configuration of said exterior electric circuit.

According to a further embodiment, the command line makes it possible to determine the direction of the charge transfer and the power delivered during the charge transfer.

According to another embodiment, the command line is established according to the protocol of the standard CEI 61851-1.

According to one embodiment, the control comprises the application of a predetermined control strategy for the voltage converter and for the voltage inverter as a function of the configuration of the exterior electric circuit.

According to an additional embodiment, the voltage converter and the voltage inverter comprise breakers, and the control of the voltage converter and of the voltage inverter comprises the opening and the closing of the breakers of said voltage converter and voltage inverter.

According to another embodiment, the earth terminal of the exterior electric circuit is linked to an element of the bodyshell of the automotive vehicle.

According to a further embodiment, the exterior electric circuit is a three-phase AC voltage network.

According to an additional embodiment, the exterior electric circuit is a single-phase AC voltage network.

According to another embodiment, the exterior electric circuit is a DC voltage network.

According to a further embodiment, the exterior electric circuit is another vehicle.

According to all the embodiments mentioned hereinabove, the electrical phases of the motor are not connected together electrically, that is to say no phase has a terminal directly connected to a terminal of another phase. Examples of phases connected together electrically are star-connected phases or phases connected polygonally, that is to say in a triangle in the three-phase case. This electrical disconnection of the phases of the electric motor is obtained according to the embodiments hereinabove by virtue of the employment of an H-bridge specific to each phase of the motor.

According to all the embodiments mentioned hereinabove, when the configuration of the exterior electric circuit is detected, it is possible to determine whether the exterior electric circuit is a three-phase AC voltage network, a single-phase AC voltage network, a DC voltage network or a DC current network and the converter and the voltage inverter are then controlled as a function of this configuration. Stated otherwise, the device is able to operate with any of the exterior electric circuits mentioned hereinabove and not with just one of these exterior electric circuits. The electrical control device can thus be configured to be supplied by any one of a three-phase AC voltage network, of a single-phase AC voltage network, of a DC voltage network and of a DC current network.

In combination or independently of what is set forth in the previous paragraph, when the charge transfer is determined, it is possible to determine whether the latter occurs from the exterior electric circuit to the accumulation means or from the accumulation means to the exterior circuit and the converter and the voltage inverter are then controlled as a function of this configuration.

The method can be implemented with a single electric motor, that is to say the voltage inverter is connected only to a single electric motor.

The embodiments of the present invention also relate to a charge transfer device comprising an electrical control device for an electric motor of an automotive vehicle, said electrical control device comprising:

accumulation means,
a voltage converter connected to the accumulation means,
an H-bridge voltage inverter connected to the voltage converter on the one hand and to the phases of the motor on the other hand, characterized in that said electrical control device also comprises means of control of the voltage converter and of the voltage inverter as a function of a charge transfer between the accumulation means and the exterior electric circuit.

According to another embodiment, the electrical control device of the charge transfer device furthermore comprises:
 means for connecting the device with an exterior electric circuit outside said automotive vehicle,
 means for detecting the configuration of the exterior electric circuit,
 means for determining the charge transfer, especially on the basis of the detection of the configuration of the exterior electric circuit.

According to another embodiment, the means for detecting the configuration of an exterior electric circuit comprise a command line and means for managing said command line making it possible to exchange with the exterior electric circuit information relating to the configuration of said exterior electric circuit.

According to an additional embodiment, the means for connecting the electrical control device comprise a plurality of distinct connectors intended to be connected to a specific type of exterior electric circuit.

The device can be such as mentioned in regard to the method.

Other characteristics and advantages of the invention will be apparent in the description which will now be given thereof, with reference to the appended drawings which represent, by way of nonlimiting indication, a possible embodiment thereof.

In these drawings.

In these figures, the same reference numerals designate identical elements.

In the description which follows, generally:
 the term "insulated gate bipolar transistor (IGBT)" corresponds to a hybrid transistor, grouping together a field-effect transistor with metal-oxide gate ("metal-oxide semiconductor field effect transistor (MOSFET)") at the input and a bipolar transistor at the output;
 the term "reversible" associated with a converter (for example an inverter or a voltage converter) defines the capability of a converter to operate in both directions in terms of power (the inputs and outputs of the converter can also be respectively outputs and inputs);
 the term "midpoint" relating to a coil relates to an arbitrary intermediate point between the two ends of a coil. Nonetheless, within the framework of the present invention, this midpoint is preferably situated in the middle of the coil so as to balance the currents between the two half-coils and thus reduce vibrations during the charging cycles.

The embodiments of the present invention relate to the management of the charge transfers at the level of an electrical control device for an electric motor intended to set an automotive vehicle into motion.

Figure 1:
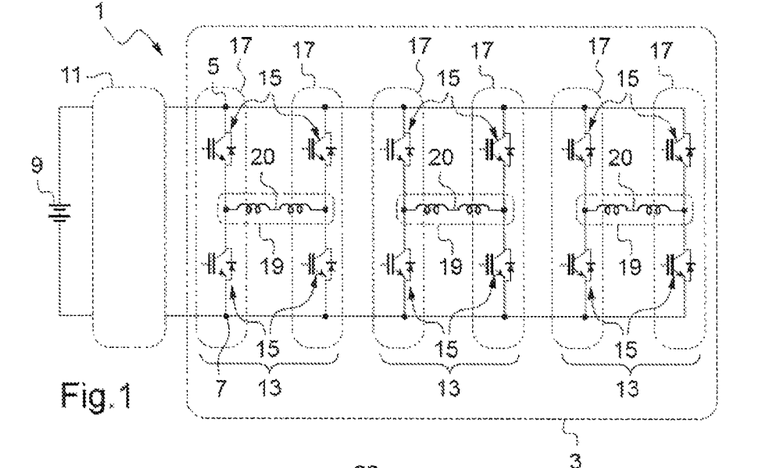
FIG. 1 represents an electrical diagram of a control device for a three-phase electric motor.

FIG. 1 represents an electrical diagram of a control device 1 for a three-phase electric motor according to the present invention.

The control device 1 comprises an H-bridge voltage inverter 3 whose exterior terminals 5 and 7 are connected to accumulation means 9, generally a high-voltage rechargeable battery (or a set of batteries) by way of a voltage converter 11.

The voltage inverter 3 consists of three H-bridges 13. The H-bridge structure 13 corresponds to an electric circuit comprising four breakers 15 generally disposed schematically in the form of an H, the two vertical branches of the H 17 each comprise two breakers 15 disposed on either side of the horizontal branch of the H 19 which corresponds to the load of the bridge. In the case of the present invention, this load corresponds to the winding of a phase of an electric motor and more particularly to a midpoint winding 20.

In order to allow the reversibility of the electric circuit, the breakers 15 are generally embodied by a transistor mounted in parallel with a diode, the transistor generally being an insulated gate bipolar transistor (IGBT).

Figure 2:
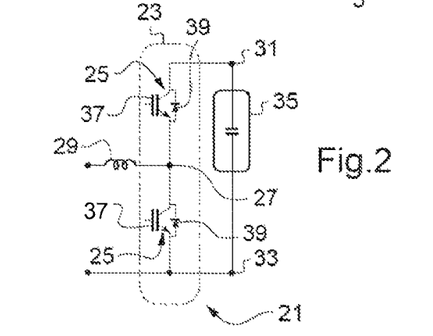
FIG. 2 represents an electrical diagram of a voltage step-up circuit.

Moreover, the voltage converter 11 is a DC-DC voltage converter and corresponds generally to a step-up circuit 21 such as represented in FIG. 2 but a step-down or step-up/step-down circuit can also be used within the framework of the present invention.

The step-up circuit 21 of FIG. 2 consists of a branch 23 comprising two breakers 25 situated on either side of a midpoint 27 linked to an inductive element 29, the exterior terminals 31 and 33 of the branch being linked to a capacitive element 35. Just as for the voltage inverter 3, in order to allow the reversibility of the electric circuit, the breakers 25 of the step-up circuit 21 generally consist of a transistor of IGBT type 37 mounted in parallel with a diode 39.

Figure 3:
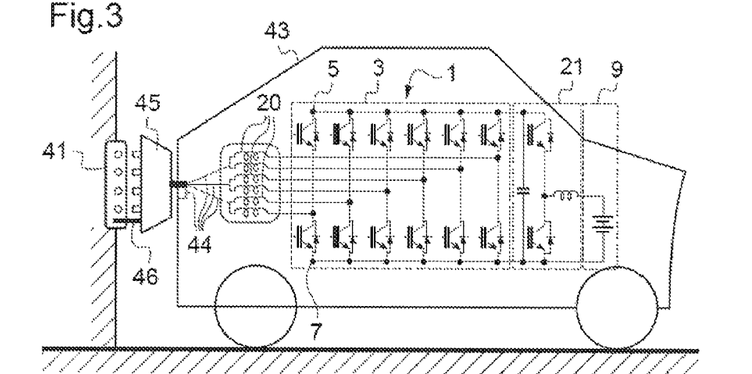
FIG. 3 represents a diagram of an automotive vehicle comprising a control device for a three-phase electric motor as well as the electrical connections allowing a charge transfer between the accumulation means and an exterior electric circuit outside the vehicle.

FIG. 3 shows an automotive vehicle 43 comprising a control device 1 such as described in FIG. 1. Moreover, means for connecting the electrical control device 1 comprise electrical links 44 between the midpoints of the windings 20 and the terminals of an electrical connector 45. According to one embodiment of the present invention, an electrical link 44 links an element of the bodyshell to one of the terminals of said electrical connector 45 corresponding to the earth terminal.

Upon the connection of the electrical connector 45 to the exterior electric circuit 41, detection means allow the vehicle 43 to determine the configuration of the exterior electric circuit 41 to which it is connected. These detection means comprise for example the establishment of a command line 46 between the exterior electric circuit 41 and the vehicle 43 which makes it possible to transmit information, especially relating to the configuration of the exterior electric circuit 41, such as for example the power available. The command line 46 being, for example, an electrical connection effected via the electrical connector 45 and according to the standard CEI 61851-1.

Moreover, the vehicle 43 can comprise several electrical connectors 45 of various types. For example, a first connector 45 intended to be connected to a single-phase voltage network and a second connector 45 intended to be connected to a three-phase voltage network, the connectors 45 can be standardized, for example by the standard CEI 61851-1.

Thus, as a function of the type of exterior circuit, the appropriate connector 45 is used and then as a function of the exterior electric circuit 41 configuration detected by the command line 46, a control strategy for the voltage inverter 3 and for the voltage converter 11 is applied. The strategy applied corresponds to a strategy selected from among a plurality of predefined strategies.

Figure 4:
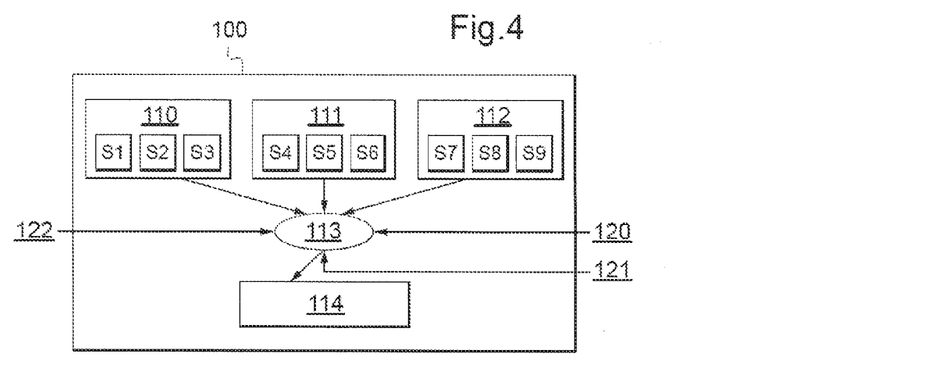
FIG. 4 represents a diagram of a monitoring unit allowing the selection of a control strategy for the voltage inverter and for the voltage converter.

FIG. 4 represents an exemplary monitoring unit 100 carrying out the processing of the data allowing the selection of a predetermined strategy.

The various switching strategies S1 . . . S9 are saved in modules 110, 111 and 112 comprising respectively the switching strategies corresponding to a charge transfer from an exterior electric circuit to the accumulation means, from the accumulation means to an exterior circuit and the control strategies for the motor in the driving phase. The number of strategies for each module being able to vary (here the number of 3 strategies per module is simply indicative).

The monitoring unit is connected to communication means 120, 121 and 122 corresponding respectively:
- to the state of the vehicle 43, indicating for example whether the vehicle 43 is on charge or in driving mode,
- to the state of the accumulation means indicating the charge level of the battery 9,
- to the configuration of the exterior electric circuit 41, these means of communication 122 corresponding for example the command line 46.

On the basis of the information received, a selection module 113 makes it possible to determine the appropriate strategy. For example, on the basis of the state of the vehicle or of the detection of a connection of the vehicle to an exterior electric circuit, the selection module determines whether or not the vehicle is on charge. If the vehicle is in driving mode, the selection module 113 selects a strategy in the module 112 corresponding to the driving strategies. The choice of a strategy can depend, for example on the driving mode chosen (sporty, economical, urban, etc.). If the vehicle is in charge mode, the selection module 113 determines the direction of the charge transfer as a function of the information on the configuration of the exterior electric circuit and on the state of the battery and then selects the appropriate strategy in the module 110 or 111 as a function of the type of exterior electric circuit (single-phase or three-phase voltage source, etc.).

The selection module 113 thereafter transmits the selected strategy, for example the strategy S6, to a module for controlling the switchings of the breakers 114. The control module 114 then commands the switching, that is to say the opening and the closing, of the breakers 15, 25 of the voltage inverter 3 and of the voltage converter 11 according to the selected switching strategy.

In the subsequent description, the various configurations envisaged of exterior electrical circuits 41 and the various corresponding connection configurations will be presented. In practice, to each connection configuration there corresponds a control strategy for the switching of the breakers 15, 25.

1) The Exterior Electric Circuit is a Three-Phase AC Voltage Network 48

Figure 5:
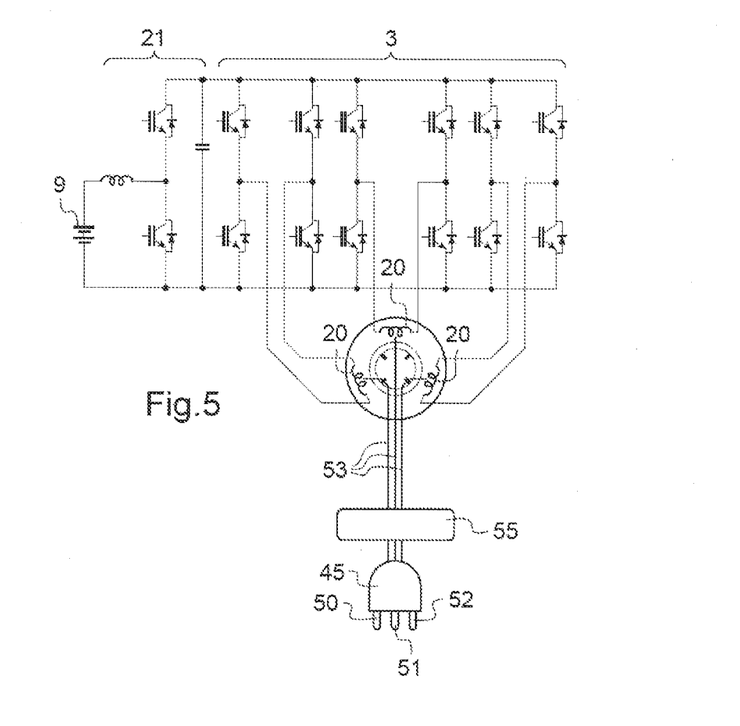
FIG. 5 represents a control device for an electric motor and the electrical connections necessary to connect to a three-phase AC network.
Figure 6:
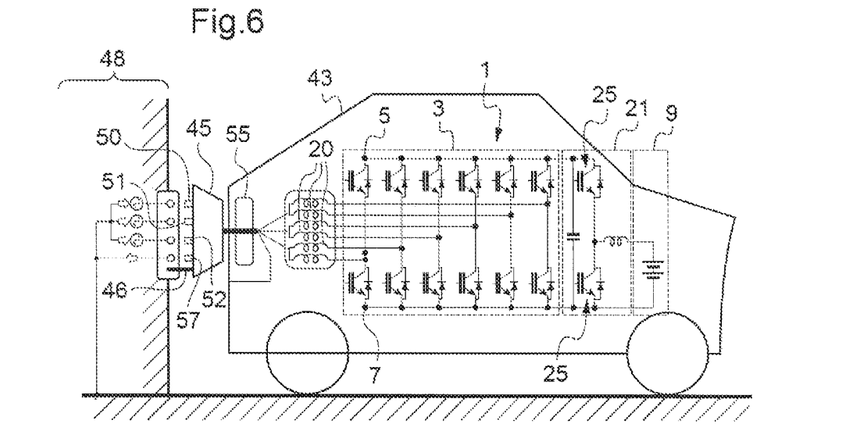
FIG. 6 represents a diagram of an automotive vehicle comprising a control device for a three-phase electric motor as well as the electrical connections making it possible to connect to a three-phase AC network.

FIGS. 5 and 6 represent the electrical connections established in the case of a connection of the vehicle described in FIG. 3 to a three-phase AC voltage network. In this case, the standardized connector 45 corresponding to a three-phase AC voltage network is connected to the network 48. Three predetermined terminals 50, 51 and 52 of the electrical connector 45 are linked to the midpoints of the windings 20 corresponding to the three phases of the motor. The electrical link between the connector 45 and the midpoints of the windings 20 is effected, for example, by cables 53. Moreover, a module 55 for protection in relation to electrical components and people, and for filtering against electromagnetic interferences can be added at the level of the cables 53.

Once the connection with the exterior circuit 48 has been performed, the command line 46 then allows the vehicle 43 to determine the configuration of the exterior electric circuit 48, especially the power available on the network. As a function of the value of this power and of the state of charge of the accumulation means 9 of the vehicle 43, a control strategy for the breakers of the voltage inverter 3 and of the voltage converter 11, 21 is selected and applied.

The AC voltage provided by the network 48 is then converted into DC voltage by the voltage inverter 3 and transmitted to the battery 9 by way of the voltage converter 21 which makes it possible to adjust the value of the voltage to an optimal value for the battery 9. Moreover, by taking into account the available power and the state of charge of the accumulation means 9 of the vehicle 43, the control strategy for the breakers 15, 25 makes it possible to reduce the risk of saturation of the network. Indeed, if the battery 9 is completely discharged, the selected strategy corresponds to maximum available power consumption so as to allow fast recharging. Conversely, if the battery 9 already has a high charge level, the selected strategy corresponds to reduced power consumption.

Moreover, a fourth terminal 57 of the connector 45, corresponding to the earth terminal is linked to an element of the bodyshell of the vehicle 43 as represented in FIG. 6.

Moreover, in certain cases, it may be necessary to discharge the battery 9 to the network 48. Indeed, in the case of saturation of the network for example, it may be necessary to reduce the charge transfer to the battery 9 or indeed even to discharge the battery 9 to the network 48 so as to help to avoid a fault with the network 48. The probability of such an eventuality may seem low but becomes significant in the case of a generalization of the electric vehicles 43. Indeed, the users of electric vehicles 43 will tend to recharge their electric vehicle 43 in the evening on returning home, and this will give rise to a consumption spike. Thus, by monitoring the charging and the discharging of the batteries 9, the network 48 can be stabilized and a fault with the network 48 can be avoided. The configuration of the connections between the control device 1 and the terminals of the electrical connector 45 for discharging the battery 9 to the network 48 is the same as for the charging of the battery 9 since as described previously the control device 1 is reversible. The only change will concern the commanding of the breakers 15, 25 of the inverter 3 and of the voltage converter 11, 21 which will make it possible to transfer the charge in one direction or the other.

Moreover, so as to obtain a discharge of the battery 9 to the network 48, a discharge request is dispatched by the network 48 to the electric vehicle 43 to ask for the battery 9 to be discharged. The dispatching of the request can, for example, be carried out by way of the command line 46.

The vehicle can then accept or not the discharging of the battery 9, this decision can be taken, for example as a function of the charge level of the battery 9 or of other parameters (selection by the user of a mode without discharge, etc.).

In response to the request and in the case of acceptance of battery discharge, the electric vehicle 43 controls the breakers 15, 25 of the inverter 3 and of the voltage converter 11, 21 so as to transfer the charge from the battery 9 to the network 48. Moreover, a minimum charge threshold below which the battery 9 can no longer be discharged is defined, for example, by the owner of the electric vehicle 43 or by a configuration of the constructor in such a way that the user of the electric vehicle 43 always possesses a minimum charge of the battery 9 at the moment of disconnection of the vehicle 43 from the network 48.

2) The Exterior Electric Circuit is a Single-Phase AC Voltage Network 54

Figure 7:
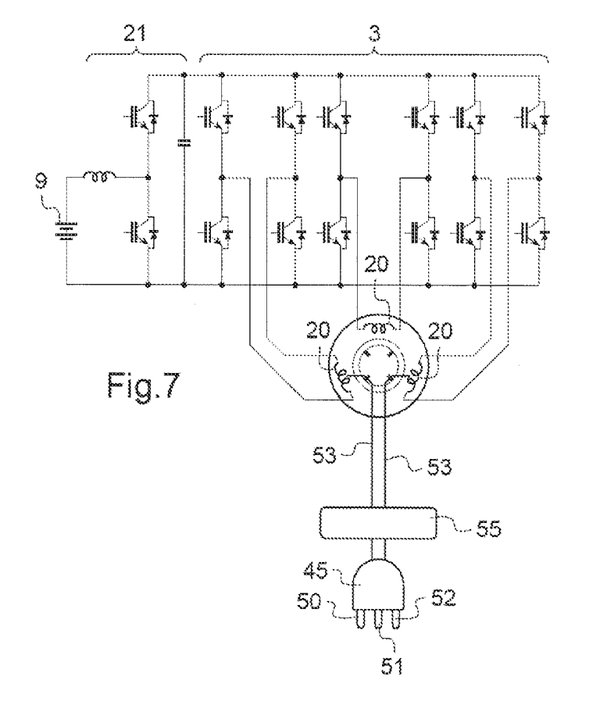
FIG. 7 represents a control device for an electric motor and the electrical connections necessary to connect to a single-phase AC network.
Figure 8:
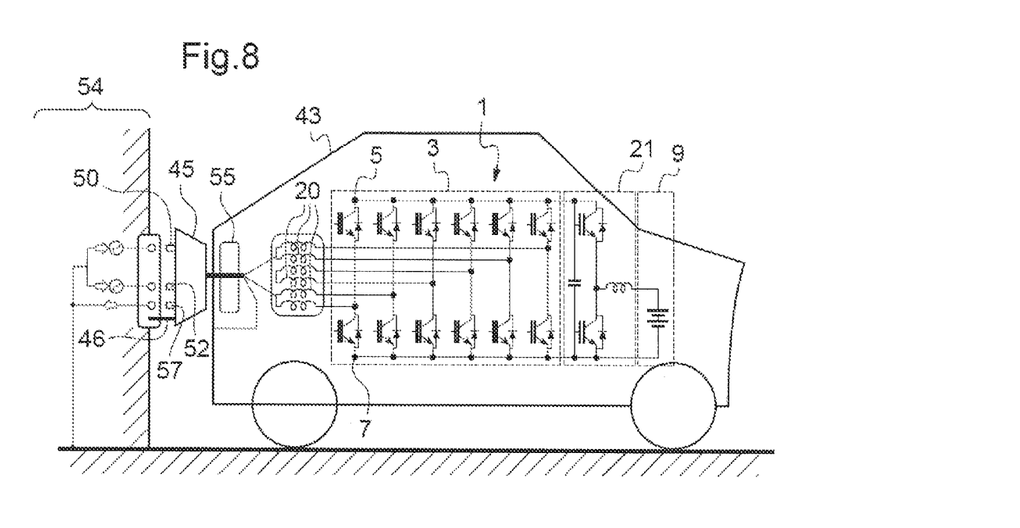
FIG. 8 represents a diagram of an automotive vehicle comprising a control device for a three-phase electric motor as well as the electrical connections making it possible to connect to a single-phase AC network.

FIGS. 7 and 8 represent the electrical connections established by an electrical connector 45 in the case of a connection of the vehicle 43 to a single-phase AC voltage network 54. These figures correspond to FIGS. 5 and 6, the electrical connector 45 used being different and adapted for a single-phase AC voltage network 54. Thus, only two predetermined terminals 50 and 52 of the electrical connector 45 are linked to the midpoints of the windings 20 corresponding to two of the phases of the electric motor by electrical links.

It should be noted that the choice of the two phases (from among the three phases of the motor) is of no importance. Moreover, a third terminal 57 of the electrical connector 45, corresponding to the earth terminal, is linked to an element of the bodyshell of the vehicle 43 as represented in FIG. 7.

The manner of operation being moreover identical to the previous embodiment (connection to a three-phase network), the detection of the configuration of the exterior electric circuit 54 is therefore carried out by a command line 46 and a strategy for switching the breakers 15, 25 is then determined. Moreover, a charge transfer from the battery 9 to the network 54 can be carried out subsequent to a request of the network 54 if necessary.

3) The Exterior Electric Circuit is a DC Voltage Network 59

Figure 9:
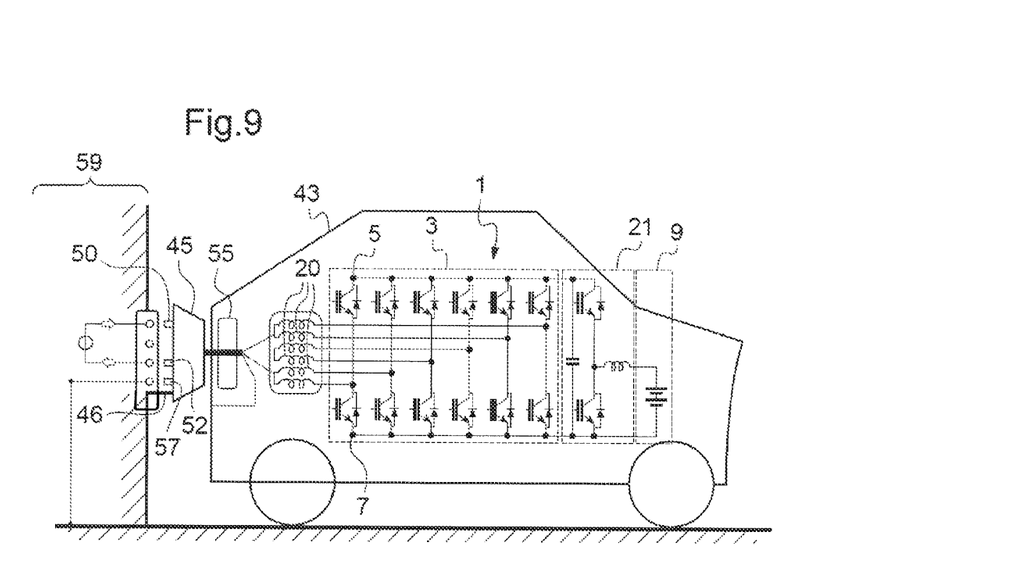
FIG. 9 represents a diagram of an embodiment of a control device for a three-phase electric motor of an automotive vehicle as well as the electrical connections making it possible to connect to a DC voltage network.

FIG. 9 represents the electrical connections established by an electrical connector 45 in the case of a connection of the vehicle 43 described previously in FIGS. 6 and 8 to a DC voltage network 59.

In this case, only two predetermined terminals 50 and 52 of the connector 45 are linked to the midpoints of the windings 20 corresponding to two of the phases of the motor by electrical connections as represented in FIG. 8. It should be noted that the choice of the two phases (from among the three phases of the motor) is of no importance.

Moreover, a third terminal 57 of the electrical connector 45, corresponding to the earth terminal, is linked to an element of the bodyshell of the vehicle 43. This earth terminal is optional if the DC voltage network is insulated and is necessary if the DC voltage network is not insulated.

The DC voltage source 59 is then wired up to the inverter 3 via two inductors corresponding to the half-windings 20 of the phases of the electric motor.

Figure 10:
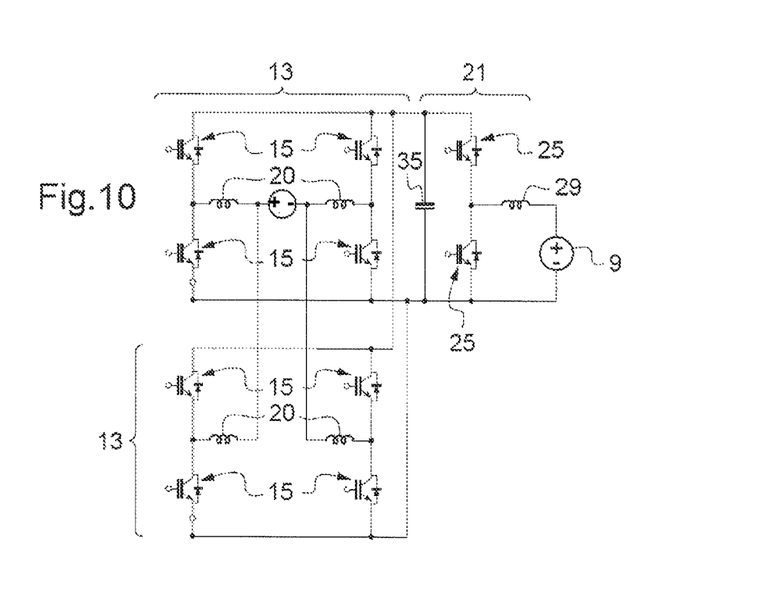
FIG. 10 represents an equivalent electrical diagram of the electrical connections of the diagram of FIG. 9.

FIG. 10 represents the equivalent electrical diagram. In this FIG. 10, only the two H-bridges 13 of the voltage inverter 3 corresponding to two phases of the electric motor are represented since the winding of the third phase is not connected and therefore, consequently, the third H-bridge 13 is inactive. The two H-bridges 13 of the inverter 3 constitute an interleaved system with two identical patterns.

This interleaved system can be simplified. The simplified equivalent diagram is presented in FIG. 11.

Figure 11:
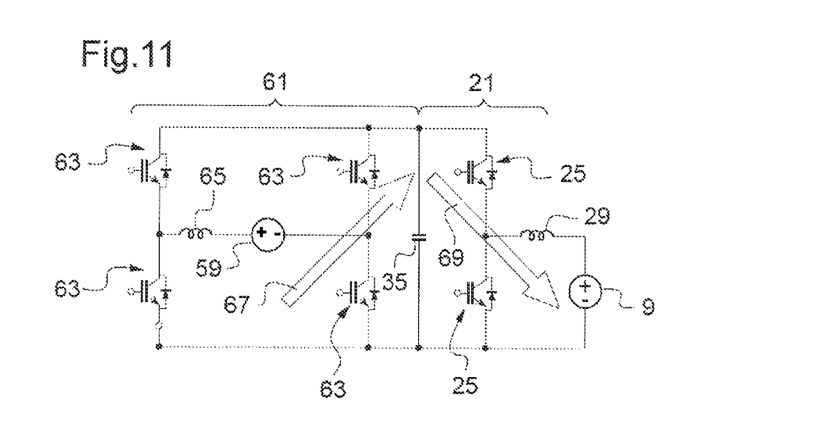
FIG. 11 represents a simplified electrical diagram of the diagram of FIG. 10.

In this diagram, it is possible to discern a first portion 61, comprising 4 breakers 63 and an inductive element 65, equivalent to a voltage step-up layout, modeled by an upward arrow 67 and a second portion (corresponding to the step-up circuit 21) acting as a voltage step-down layout modeled by a downward arrow 69. Thus, upon connection to the DC voltage network 59, the voltage provided is firstly stepped up by the first portion 61 corresponding to a step-up layout and then is stepped down via the second portion 21 corresponding to a step-down layout.

The control of the step-up circuit 21 makes it possible to monitor the current absorbed in the battery 9 just as for the charge on an AC network.

Moreover, in the same manner as in the previous embodiments, the establishment of a command line 46 allows the detection of the configuration of the exterior electric circuit 59 and the determination of a strategy for commanding the breakers 15, 25 of the voltage inverter and of the voltage converter 11, 21. Moreover, the circuit presented in FIG. 11 is also reversible so that a transfer from the battery 9 to the network 59 can also be carried out.

Figure 12:
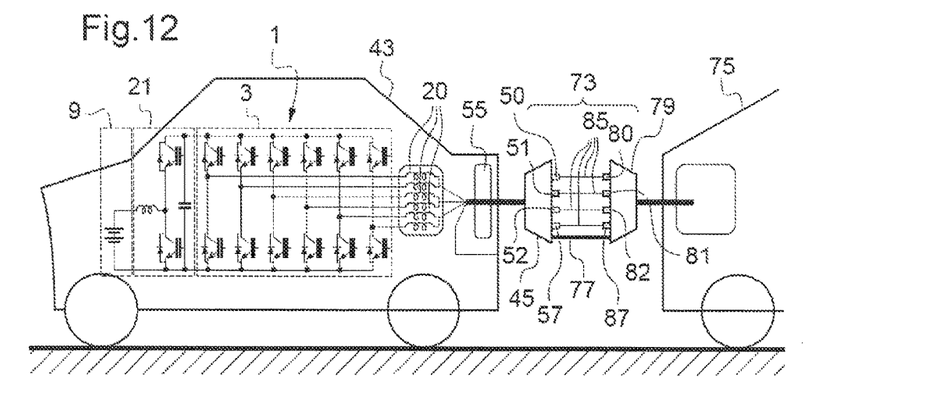
FIG. 12 represents a diagram of a control device for a three-phase electric motor of an automotive vehicle as well as the electrical connections making it possible to connect to another vehicle configured to recharge its battery on an AC voltage network.

4) The Exterior Electric Circuit is a Second Vehicle 75, for Example, Requiring AC Voltage Battery Recharging FIG. 12 represents the electrical connections established by the electrical connector 45 in the case of a connection to a second vehicle 75 requiring AC voltage battery recharging.

The electrical connector 45 can also be used to establish an electrical link 73 with a second vehicle 75 so as to make it possible to recharge the battery of the second vehicle 75, for example in the case of fault due to a low battery. In the case where the second vehicle 75 is a vehicle having to recharge on a three-phase AC voltage source the electrical connections are established as described in FIG. 12.

A command line 77 is established between the first and the second 75 vehicle so as to detect the configuration of the second vehicle 75. The protocol of this command line 77 can correspond to the protocol of the command line 46 described previously in the case of a connection to an electrical network.

The electrical connections are established so that three predefined terminals 50, 51 and 52 of the electrical connector 45 are connected to the midpoints of the windings 20 corresponding to the phases of the electric motor of the first vehicle 43 just as for the recharging on a three-phase AC voltage source and said three predefined terminals 50, 51 and 52 are connected to three corresponding predefined terminals 80, 81 and 82 of the electrical connector 79 of the second vehicle 75, for example, by way of electrical cables 85. A fourth cable 85 makes it possible to link the fourth predefined terminals 57 and 87 corresponding to the earth terminals (linked to an element of the bodyshell) of the two vehicles 43, 75. In practice, the set of cables 85 corresponding to the diverse connections and to the command line 77 can be bundled as a harness.

When the various connections are established between the two vehicles, the battery 9 of the first vehicle 43 can then discharge so as to recharge the battery (not represented) of the second vehicle 75. Moreover, the command line 77 makes it possible to determine the characteristics (voltage, etc.) of the charge to be transferred to the second vehicle 75 and to command the breakers 15, 25 of the inverter 3 and of the step-up circuit 21 accordingly.

In the case where the second vehicle 75 is a vehicle having to recharge on a single-phase AC voltage source, the charge transfer from a first vehicle to a second vehicle is carried out in the same manner, the only difference being the establishment of connections with the midpoints of only two of the phases of the motor (as in the case of recharging on a single-phase network).

Figure 13:
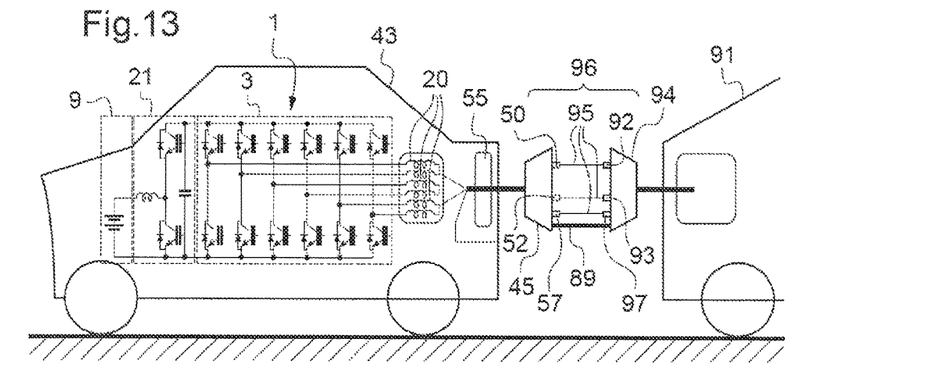
FIG. 13 represents a diagram of a control device for a three-phase electric motor of an automotive vehicle as well as the electrical connections making it possible to connect to another vehicle configured to recharge its battery on a DC voltage network.

5) The Exterior Electric Circuit is a Second Vehicle 91 for Example Requiring DC Voltage Battery Recharging This is the case for example if the charge pick-up of the second vehicle 91 is connected directly to the battery 9.

FIG. 13 represents the electrical connections established by the electrical connector 45 in the case of a connection to a second vehicle 91 requiring DC voltage battery recharging.

A command line 89 is established between the first and the second 91 vehicle so as to detect the configuration of the second vehicle 91. An electrical link 96 is established, as represented in FIG. 14. Two predefined terminals 50 and 52 of the electrical connector 45 are connected to the midpoints of two of the windings 20 corresponding to the phases of the electric motor of the first vehicle 43 just as for recharging on a DC voltage source. Said two predefined terminals 50 and 52 are furthermore connected to two corresponding predefined terminals 92 and 93 of the electrical connector 94 of the second vehicle 91, for example, by way of electrical cables 95. A third electrical cable 95 makes it possible to link the third predefined terminals 57 and 97 corresponding to the earth terminals (linked to an element of the bodyshell) of the two vehicles.

When the various connections are established between the two vehicles, the battery 9 of the first vehicle 43 can then discharge so as to recharge the battery (not represented) of the second vehicle 91. Moreover, the command line 89 makes it possible to determine the characteristics (voltage, etc.) of the charge to be transferred to the second vehicle 91 and to thus determine the control strategy for the breakers 15, 25 of the inverter and of the voltage converter 11, 21.

As a function of the type of exterior electric circuit (single-phase, three-phase, DC etc.), there will therefore be a suitable electrical connector (an electrical connector being able optionally to serve for several types of exterior electric circuits) making it possible to establish the appropriate electrical connections and then as a function, especially, of the exterior electric circuit configuration detected, a predetermined control strategy for the switching of the breakers 15, 25 of the voltage inverter 3 and of the voltage converter 11, 21 will be applied.

Thus, the use of an electrical control device for an electric motor comprising an H-bridge inverter 3, the establishment of electrical links between the electrical control device and an exterior electric circuit and the application of a control strategy for the voltage inverter 3 and for the voltage converter 11, 21 as a function of the type and of the configuration of an exterior electric circuit to which the electrical control device is connected makes it possible to obtain a charge device suitable for a large number of types of network without having to add numerous electrical adaptation components for the various configurations of exterior electric circuits.

Moreover, the reversibility of the electrical control device allows discharging of the battery to the exterior electric circuits thereby allowing on the one hand the repairing of a fault with another vehicle making it necessary to recharge its battery and on the other hand to allow the stabilization of a network (for example in the case of saturation). Moreover, the small number of components used for all the embodiments of the invention makes it possible to reduce the cost of a "quasi-universal" charge transfer device and to reduce the total weight of the electrical device allowing the control of the motor and the recharging of the accumulation means.

It should also be noted that the embodiments of the present invention are not necessarily limited to the domain of automotive vehicles so that a device for charge transfer between accumulation means of a control device and an exterior electric circuit such as previously described but whose electrical control device would not be intended to command an electric motor of an automotive vehicle but an electric motor intended for another application is also covered by the scope of the present invention.

Moreover, the embodiments of the present invention are not limited to a three-phase motor but to any motor having a number of phases greater than 3 (or indeed 2 if one limits oneself to a single-phase exterior electric circuit), the exterior electric circuit then being able to have a number of phases which is less than or equal to the number of phases of the motor.

The invention claimed is:

1. A management method for managing a charge transfer between at least one rechargeable battery of an electrical control device for an electric motor of an automotive vehicle and an exterior electric circuit outside said automotive vehicle, said electrical control device comprising:
  - a voltage converter connected to the at least one rechargeable battery: and
  - an H-bridge voltage inverter connected to the voltage converter and to windings of phases of the electric motor, the windings of the phases of the electric motor not being connected together electrically,
  - wherein each of the windings of the phases of the electric motor comprise a midpoint positioned between two half-coils of the winding to balance current between the two half coils, and
  - wherein connection of the electrical control device to the exterior electric circuit outside the automotive vehicle comprises connection of the midpoints of the windings of the phases to predetermined terminals of the exterior electric circuit;
  the management method comprising:
  controlling the voltage converter and the H-bridge voltage inverter as a function of the charge transfer.

2. The management method as claimed in claim 1, further comprising, before the control of the voltage converter and of the H-bridge voltage inverter:
   connecting the electrical control device to the exterior electric circuit outside the automotive vehicle; and
   determining the charge transfer based on a detection of a configuration of the exterior electric circuit to which the electrical control device is connected.

3. The management method as claimed in claim 2, wherein when the configuration of the exterior electric circuit outside the automotive vehicle is detected, it is determined whether the exterior electric circuit is a three-phase AC voltage network, a single-phase AC voltage network, a DC voltage network or a DC current network, and wherein the converter and the H-bridge voltage inverter are controlled as a function of the detected configuration.

4. The management method as claimed in claim 3, wherein the electrical control device is configured to be supplied by one selected from the group consisting of a three-phase AC voltage network, a single-phase AC voltage network, a DC voltage network and a DC current network.

5. The management method as claimed in claim 2, wherein the converter and the H-bridge voltage inverter are controlled based on determining whether the charge transfer occurs from the exterior electric circuit outside the automotive vehicle to the at least one rechargeable battery or from the at least one rechargeable battery to the exterior circuit outside the automotive vehicle.

6. The management method as claimed in claim 2, wherein the detection of the configuration of the exterior electric circuit comprises establishment of a command line using a controller, allowing the automotive vehicle to exchange with the exterior electric circuit information relating to the configuration of said exterior electric circuit.

7. The management method as claimed in claim 6, wherein the the controller determines a direction of the charge transfer and power delivered during the charge transfer.

8. The management method as claimed in claim 7, wherein the command line of the controller is established according to a standard protocol of CEI 61851-1.

9. The management method as claimed in claim 1 the voltage converter and the H-bridge voltage inverter comprise breakers, and the control of the voltage converter and of the H-bridge voltage inverter comprises opening and closing of the breakers.

10. The management method as claimed in claim 1, wherein an earth terminal of the exterior electric circuit is linked to an element of a bodyshell of the automotive vehicle.

11. The management method as claimed in claim 1, wherein the exterior electric circuit comprises another automotive vehicle.

12. The management method as claimed in claim 1, wherein the method is implemented using a single electric motor.

13. A charge transfer device comprising an electrical control device for an electric motor of an automotive vehicle, said electrical control device comprising:
   at least one rechargeable battery;
   a voltage converter connected to the at least one rechargeable battery;
   an H-bridge voltage inverter connected to the voltage converter and to windings of phases of the electric motor, the windings of the phases of the electric motor not being connected together electrically,
   wherein the windings of the phases of the electric motor comprise midpoints, each midpoint being positioned between two half-coils of a corresponding winding to balance current between the two half coils, and
   wherein connection of the electrical control device to an exterior electric circuit outside the automotive vehicle comprises connection of the midpoints of the windings of the phases to predetermined terminals of the exterior electric circuit; and
   a controller that controls the voltage converter and the H-bridge voltage inverter as a function of a charge transfer between the at least one rechargeable battery and the exterior electric circuit.

14. The charge transfer device as claimed in claim 13, wherein the electrical control device further comprises:
   at least one connector that connects the electrical control device with the exterior electric circuit outside said automotive vehicle; and
   the controller detects a configuration of the exterior electric circuit, and
   wherein the controller that determines the charge transfer is further configured to detect the charge transfer based on the configuration of the exterior electric circuit.

15. The charge transfer device as claimed in claim 14, wherein the controller that detects the configuration of the exterior electric circuit is configured to determine whether the exterior electric circuit outside the automotive vehicle is a three-phase AC voltage network, a single-phase AC voltage network, a DC voltage network, or a DC current network, and the controller that controls the voltage converter and of the H-bridge voltage inverter is configured to control the voltage converter and the H-bridge voltage inverter according to the detected configuration.

16. The charge transfer device as claimed in claim 15, wherein the controller that determines the charge transfer determines whether the charge transfer occurs from the exterior electric circuit outside the automotive vehicle to the at least one rechargeable battery, or from the at least one rechargeable battery to the exterior electric circuit outside the automotive vehicle, and the controller that controls the voltage converter and the H-bridge voltage inverter is configured to control the voltage converter and the H-bridge voltage inverter as a function of the determination.

17. The charge transfer device as claimed in claim 13, wherein the controller that detects the configuration of the exterior electric circuit exchanges information relating to the configuration of said exterior electric circuit with the exterior electric circuit.

18. The charge transfer device as claimed in claim 13, wherein the at least one connector comprise a plurality of connectors connected to an exterior electric circuit.

19. A method for managing a charge transfer between at least one rechargeable battery of an electrical control device for an electric motor of an automotive vehicle and an exterior electric circuit outside said automotive vehicle, said electrical control device comprising:
   a voltage converter connected to the at least one rechargeable battery;
   an H-bridge voltage inverter connected to the voltage converter and to windings of phases of the electric motor, the windings of the phases of the electric motor not being connected together electrically,
   wherein each of the windings of the phases of the electric motor comprise a midpoint positioned between two half-coils of the winding to balance current between the two half coils, the method comprising:

controlling the voltage converter and the H-bridge voltage inverter as a function of the charge transfer; and determining whether the charge transfer occurs from the exterior electric circuit outside the automotive vehicle to the at least one rechargeable battery or from the at least one rechargeable battery to the exterior electric circuit outside the automotive vehicle.

20. A charge transfer device comprising an electrical control device for an electric motor of an automotive vehicle, said electrical control device comprising:

at least one rechargeable battery;

a voltage converter connected to the at least one rechargeable battery;

an H-bridge voltage inverter connected to the voltage converter on the one hand and to windings of phases of the electric motor on the other hand, the windings of the phases of the electric motor not being connected together electrically;

wherein each of the windings of the phases of the electric motor comprise a midpoint positioned between two half-coils of the winding to balance current between the two half coils, a controller that controls the voltage converter and the H-bridge voltage inverter as a function of a charge transfer between the at least one rechargeable battery and an exterior electric circuit, wherein the controller determines the charge transfer and determines whether the charge transfer occurs from the exterior electric circuit outside the automotive vehicle to the at least one rechargeable battery, or from the at least one rechargeable battery to the exterior circuit outside the automotive vehicle.

* * * * *